United States Patent [19]

Hert et al.

[11] Patent Number: 5,662,975

[45] Date of Patent: Sep. 2, 1997

[54] COMPOSITE TUBULAR ARTICLE CONSISTING OF A ... PETROL PIPE AND PROCESS FOR THE PREPARATION OF SUCH AN ARTICLE

[75] Inventors: Marius Hert, Serquigny; Christian Dousson, St. Victor de Chretienville; Serge Nawrot, Serquigny, all of France

[73] Assignee: ELF Atochem S.A., Puteaux, France

[21] Appl. No.: 632,044

[22] Filed: Apr. 15, 1996

Related U.S. Application Data

[63] Continuation of Ser. No. 180,384, Jan. 12, 1994, abandoned.

[30] Foreign Application Priority Data

Jan. 13, 1993 [FR] France ................... 93 00226

[51] Int. Cl.$^6$ ................... B29C 35/06; F16L 11/08
[52] U.S. Cl. ................... 428/36.91; 428/421; 428/477.4; 428/475.5; 428/501; 264/209.1; 138/141
[58] Field of Search ................... 428/36.91, 421, 428/477.4, 475.5, 501; 138/141; 264/209.1

[56] References Cited

U.S. PATENT DOCUMENTS

| | | | |
|---|---|---|---|
| 4,950,436 | 8/1990 | Kitami | 264/103 |
| 5,132,182 | 7/1992 | Grosse-Puppendahl et al. | 428/475.8 |

FOREIGN PATENT DOCUMENTS

| | | |
|---|---|---|
| 3439312 | 5/1985 | Germany . |
| 3914011 | 11/1989 | Germany . |
| 4026161 | 2/1991 | Germany . |
| 4132123 | 4/1992 | Germany . |

OTHER PUBLICATIONS

Derwent Abstract of Japanese Patent No. 2,217,863.
Derwent Abstract of Japanese Patent No. 4,086,258.
Patent Abstracts of Japan Abstract of Japanese Patent No. 2,217,863.
Patent Abstracts of Japan Abstract of Japanese Patent No. 4,086,258.

*Primary Examiner*—Charles Nold
*Attorney, Agent, or Firm*—Pennie & Edmonds LLP

[57] ABSTRACT

The invention relates to a composite tubular article consisting of a vulcanized elastomer containing carboxylic acid or dicarboxylic acid anhydride functional groups, which is used in combination with a thermoplastic elastomer containing polyamide blocks. The invention also relates to a process for the preparation of such articles, characterized in that a tube consisting of an outer layer of thermoplastic elastomer containing polyamide blocks and optionally an inner layer consisting of a thermoplastic with good liquid-barrier property is sheathed by extrusion at an appropriate temperature of an elastomeric composition comprising a synthetic or natural elastomer containing carboxylic acid or dicarboxylic acid anhydride functional groups, a crosslinking system and optionally various adjuvants and fillers, in that the composite tubular article obtained is vulcanized, preferably at a temperature of between −5° C. and +30° C. in relation to the Vicat point of the said thermoplastic elastomer containing polyamide blocks. This process produces composite tubular articles exhibiting excellent properties, particularly of flexibility and of peel strength of the outer layer.

The invention also relates to petrol pipes consisting of such articles in which the inner face of the thermoplastic tube is coated with a polymer for protection against liquids and preferably against fuels.

28 Claims, No Drawings

COMPOSITE TUBULAR ARTICLE CONSISTING OF A ... PETROL PIPE AND PROCESS FOR THE PREPARATION OF SUCH AN ARTICLE

This is a continuation of application Ser. No. 08/180,384, filed Jan. 12, 1994, now abandoned.

The present invention relates to a composite tubular article consisting of an outer sheath of a vulcanized elastomer containing carboxylic acid or dicarboxylic acid arthydride functional groups, used directly in combination with a tube of thermoplastic elastomer containing polyamide blocks. It also relates to a process for the preparation of a composite tubular article consisting of a vulcanized elastomer used directly in combination with a tube of thermoplastic elastomer containing polyamide blocks. It further relates to pipes, especially for delivering fuels, consisting of such tubular articles.

The most commonly employed processes for assembling tubular articles of synthetic or natural vulcanized elastomer used in combination with thermoplastics are based on the extrusion sheathing of a thermoplastic tube previously made adhesive with an adhesive, frequently based on two-component polyurethane. The outer layer of elastomer is next vulcanized in an autoclave with hot air, with steam pressure, with radiation, which are conventional in the rubber industry.

Nevertheless, a large saving where the process is concerned could be obtained by eliminating the application of the adhesive.

The reactivity of certain elastomers to polymers based on polyetheresteramide is furthermore known. Thus, Japanese Patent JP 63 081158 (DW 88-138018/20) describes a thermoplastic elastomeric composition consisting of a polyetheresteramide component and of an elastomer containing at least one polar group such as a carboxylic radical.

Among these elastomers are mentioned acrylic elastomers, elastomers based on butadiene and acrylonitrile (nitrile elastomer) and fluoroelastomers (propylene/tetrafluoroethylene). These thermoplastic elastomeric compositions have a high flexibility, a good oil resistance and a high mechanical strength.

One of the objectives of the present invention is to provide a process for the preparation of a composite tubular article as defined above, avoiding the application of an adhesive.

Another objective of the present invention is to provide a process for the preparation of composite tubular articles such as that mentioned above, which can be applied industrially, employing extrusion sheathing processes.

Another objective of the present invention is to provide a tubular article as defined above exhibiting a high peel strength of the vulcanized elastomer when subjected to a separating stress.

Other advantages linked with the use of the present invention will appear during the description which follows.

Firstly, the subject of the invention is a composite tubular article consisting of an outer sheath of a vulcanized elastomer containing carboxylic acid or dicarboxylic acid anhydride functional groups, which is used directly in combination with a tube of thermoplastic elastomer containing polyamide blocks having a melting point of between 120° and 210° C., the said article exhibiting a high peel strength of the vulcanized elastomer sheath when subjected to a separating stress, preferably higher than 2 daN/cm.

The inner face of the thermoplastic tube is preferably coated with a sealing or protective inner layer which has barrier properties especially against liquids such as fuels.

These composite tubular articles exhibit characteristics of flexibility, impact strength and hot creep behavior of rubbers. Furthermore, when coated with the said inner layer, they exhibit the required imperviousness to fuels. The imperviousness can be improved by a factor of between 10 and 100 when compared with that of an equivalent rubber tube while retaining the properties which make rubber advantageous. The layer of thermoplastic elastomer containing polyamide blocks is employed in this case as a binder.

The vulcanized and thermoplastic elastomers forming the composite material are normally used in combination in a sufficiently strong manner to prevent any separation during a normal stress, bearing in mind the intended use. Thus, within the meaning of this text, the term separation is understood to mean the application to the material of a force considerably greater than that to which the said material must normally be subjected.

The separation resistance is assessed by a peeling test on a strip of tube less than 5 mm in width, cut along a generatrix. The peel strength will be preferably advantageously greater than 2 daN/cm.

Another subject of the invention is pipes for conveying fuel, which are characterized in that they consist of a tubular article as defined above.

The vulcanized synthetic or natural elastomers suitable for making use of the present invention are well known to a person skilled in the art, the term elastomer in the definition of the present invention meaning that it may consist of mixtures of several elastomers.

These elastomers or mixtures of elastomers exhibit a permanent compression set (PCS) at 100° C. lower than 50%, generally between 5 and 40% and preferably lower than 30%. These vulcanized elastomers originate from the corresponding vulcanizable elastomers.

Among these vulcanizable elastomers there may be mentioned natural rubber, polyisoprene which has a high content of double bonds in a cis position, a polymerized emulsion based on styrene/butadiene copolymer, a polymerized solution based on styrene/butadiene copolymer, a polybutadiene which has a high content of double bonds in a cis. position, obtained by catalysis with nickel, cobalt, titanium or neodymium, a halogenated ethylene/propylene/diene terpolymer, a halogenated butyl rubber, a styrene/butadiene block copolymer, a styrene/isoprene block copolymer, the halogenated products of the above polymers, an acrylonitrile/butadiene copolymer, an acrylic elastomer, a fluoroelastomer and chloroprene.

In the case where the abovementioned elastomers do not contain any carboxylic acid or such acid anhydride radicals (which is the case with most of these), the said radicals will be introduced by grafting, in a known manner, of the abovementioned elastomers or using mixtures of elastomers, for example with acrylic elastomers.

Among the abovementioned elastomers the ones advantageously chosen will be those included in the following group: carboxylated nitrile elastomers, acrylic elastomers, carboxylated polybutadienes, grafted ethylene/propylene/diene terpolymers or mixtures of these polymers with the same elastomers but ungrafted, like nitrile rubbers; including hydrogenated nitrile rubber (HNBR), epichlorohydrin rubber,

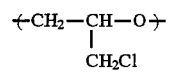

which may also contain ethylene oxide units —(—$CH_2$—$CH_2$—O—)— and also vinyl acetate units, polybutadienes and ethylene/propylene/diene terpolymers, by themselves or mixed.

The abovementioned vulcanizable elastomers preferably include a weight content of carboxylic acid or dicarboxylic acid anhydride radicals of between 0.3 and 10% relative to the said elastomers.

The vulcanized elastomers preferably contain fillers, the filler content being preferably, in parts by weight, between 5 and 100 parts per 100 parts of vulcanized elastomer.

The thermoplastic elastomers containing polyamide blocks are those in which the polyamide blocks are separated by different blocks such as, for example, polyester, polyether or polyurethane.

The polyamide block will be preferably chosen from polyamides 6, 11 or 12 and the polyether blocks will be chosen from polyethylene oxides, polypropylene oxides and polytetramethylene oxides or a mixture of these different units of molecular weight of between 100 and 6,000.

The thermoplastic elastomers containing polyamide blocks which are advantageously employed for making use of the process are polyethers containing polyamide blocks (or polyetheramides).

Polyethers containing polyamide blocks mean both polyethers containing random polyamide blocks (that is to say those formed by random chain sequencing of the various monomeric constituents) and polyethers containing sequenced polyamide blocks, that is to say blocks exhibiting a certain chain length of their various constituents.

Polyethers containing polyamide blocks which are suitable for the present invention are well known to a person skilled in the art. They are obtained by a reaction of condensation of polyamide blocks containing reactive ends with polyether blocks containing reactive ends, such as, among others:

1-Polyamide blocks with diamine chain ends with polyoxyalkylene blocks with dicarboxylic chain ends.

2-Polyamide blocks with dicarboxylic chain ends with polyoxyalkylene blocks with diamine chain ends obtained by cyanoethylation and hydrogenation of aliphatic alpha, omega-dihydroxylated polyoxyalkylene blocks called polyether diols.

3-Polyamide blocks containing dicarboxylic chain ends with polyether diols, the polyether amides obtained being, in this particular case, polyether ester amides.

The composition and the manufacture of such polyetheresteramides have been described in French Patent No. 74 18913 and 77 26678 in the name of the Applicant Company, and the content thereof is added to the present description.

According to one embodiment of the invention the polyetheramide is a block polyetheresteramide of molecular weight greater than 10,000, consisting of the product of the copolycondensation of an alpha, omega-dicarboxylic polyamide or copolyamide exhibiting a molecular weight of 300 to 5,000 and, preferably 600 to 5,000, employed in a proportion of 95 to 15% by weight and of a polyether diol exhibiting a molecular weight of 100 to 6000 and, preferably, 200 to 3,000, employed in a proportion of 5 to 85% by weight.

Among the polyethers there may be mentioned polyoxyethylene glycol, polyoxypropylene glycol, polyoxytetramethylene glycol, which has a mean molecular weight of between 100 and 6,000, preferably between 200 and 3,000. These polyethers may also result from mixtures of polymers referred to above. The extension of the polyether chains is provided by ester bonds.

With regard to the polyamides, the ones preferably employed will be those available and known by the names of nylon 6, 11, 12, 66 and 612.

These polyethers containing polyamide blocks will advantageously have a Vicat point of between 100° and 200° C., preferably between 130° and 175° C. and a melting point of between 120° and 210° C. and preferably between 140° and 180° C.

The inner face of the thermoplastic tube is advantageously coated with an inner protective or sealing layer particularly against the liquids which can travel inside the tubular articles. One or more intermediate layers may be present between this inner sealing layer and the layer of thermoplastic elastomer containing polyamide blocks.

The coatings forming the inner layer may be chosen for their imperviousness to fuels, such as polyvinylidene fluoride or polyamides 6, 66, 11 and 12, and preferably polyamides 11 and 12, plasticized or otherwise, or their copolymers or blends of these polyamides with polyolefins. The coating application may require the presence of a coextrusion adhesive, as a person skilled in the art is well aware.

The polyvinylidene fluoride is usually a homopolymer or copolymer containing at least 70% by weight of vinylidene fluoride. The polyvinylidene fluoride may also be mixed with another thermoplastic polymer, on the condition that 50% by weight of polyvinylidene fluoride is present in the mixture. In order to ensure the adhesion between the polyvinylidene fluoride and the thermoplastic elastomer containing polyamide blocks an intermediate layer is employed in a known manner, consisting of a polymer containing carbonyl groups on its polymer chain, such as a polyurethane, a polyurea, a polyester, a copolymer of ethylene with vinylacetate, acrylic esters or carbon monoxide, or mixtures of these polymers. This adhesive binder between polyvinylidene fluoride and thermoplastic elastomer containing polyamide blocks may contain polyvinylidene fluoride in a proportion of 1 to 50% by weight.

Other coatings which are well known to a person skilled in the art may also be suitable.

Another subject of the invention is a process for the preparation of the composite tubular articles described above, characterized in that a tube consisting of a thermoplastic elastomer containing polyamide blocks is sheathed by extrusion, at an appropriate temperature, with an elastomeric composition comprising a synthetic or natural elastomer containing carboxylic acid or dicarboxylic acid anhydride functional groups, a crosslinking system and optionally various adjuvants and fillers, and in that the sheath of elastomeric composition which is obtained is vulcanized.

The vulcanization temperature is preferably between −5° C. and +30° C. relative to the Vicat point of the said thermoplastic elastomer containing the polyamide blocks.

The elastomeric composition and its vulcanization kinetics are such that the duration of the vulcanization cycle does not exceed 15 minutes and that the composite tubular article exhibits a high peel strength of the vulcanized elastomer layer (preferably higher than 2 daN/cm).

According to an alternative form of the process according to the invention the elastomeric composition is extruded on an extruder for elastomer at a temperature of between 50° and 120° C. into a sheathing die in which there is present, preferably travelling at a constant speed, a thermoplastic tube, and the unvulcanized tubular article is placed, after optional cutting, in a conventional vulcanization autoclave for rubber (especially with hot air, with infrared and the like) in which the temperature is between −5° C. and +30° C. in relation to the Vicat point of the said thermoplastic elastomer containing polyamide blocks.

During vulcanization the tube may be maintained at its initial dimensions by being equipped with a cylindrical metal rod calibrated at the internal diameter of the tube.

This process results in tubes which have excellent properties particularly of flexibility and of peel strength of the outer layer.

The vulcanizable and thermoplastic elastomers are those which have been described above when dealing with the composite tubular article.

With regard to the polyethers containing polyamide blocks, reference will also be made to the above description relating to the composite tubular article.

The vulcanization systems which are suitable for the present invention are well known to a person skilled in the art and consequently the invention is not limited to a particular type of system. It suffices for the latter to meet the criterion relating to the vulcanization kinetics defined in the definition of the invention shown above.

When the elastomer is based on an unsaturated monomer (butadiene, isoprene, vinylidenenorbornene etc.), four types of vulcanization systems may be mentioned:

Sulphur systems consisting of sulphur used in combination with the usual accelerators such as the metal dithiocarbamate salts (zinc, tellurium or other dimethyl dithiocarbamates), thiuram disulphides (tetramethylthiuram disulphide and the like), sulphenamides and the like.

These systems may also contain zinc oxide used combination with stearic acid.

Sulphur-donating systems in which most of the sulphur employed for the bridging originates from sulphur-containing molecules such as the organosulphur compounds mentioned above.

Systems containing phenolic resins, consisting of difunctional phenol-formaldehyde resins which may be halogenated, used in combination with accelerators such as stannas chloride or zinc oxide.

Peroxide systems. Any free-radical generators may be employed (dicumyl peroxides, and the like) in combination with zinc oxide and stearic acid.

When the elastomer is acrylic (polybutylacrylate with acidic or epoxy functional groups or any other reactive functional group permitting crosslinking), conventional crosslinking agents are employed, based on diamines (orthotoluidylguanidine, diphenylguanidine and the like) or blocked diamines (hexamethylenediamine carbamate and the like).

The elastomeric compositions may be modified for certain particular properties (for example improvement in mechanical properties) by the addition of fillers such as carbon black, silica, kaolin, aluminium, clay, talc, chalk and the like. These fillers may be surface-treated with silanes, polyethylene glycols or any other coupling molecule. The filler content in parts by weight is generally between 5 and 100 per 100 parts of elastomers.

In addition, the compositions may be softened using plasticizers such as mineral oils derived from petroleum, esters of phthalic acid or of sebacic acid, liquid polymeric plasticizers such as optionally carboxylated polybutadiene of low mass, and other plasticizers which are well known to a person skilled in the art.

The combinations of vulcanizing agent which are employed for making use of the process are such that they must allow a complete crosslinking of the elastomer according to kinetics resulting in good separation strength properties like those mentioned in the definition of the invention and, in general, good rubber-like properties (measured using a permanent compression set at 100° C. tensile mechanical properties and the like).

The vulcanization temperature is preferably substantially equal to the Vicat point of the thermoplastic elastomer containing polyamide blocks with a tolerance of ±5° C.

The vulcanization temperature in the autoclave will be advantageously between 130° and 180° C.

The kinetics measured with the aid of an oscillating rheometer will be advantageously such that the characteristic time for 90% vulcanization, $t_{90}$, does not exceed 15 minutes and will be advantageously between 5 and 10 minutes.

Furthermore, it has been found that the time of onset of vulcanization (or setting time) corresponding to a torque increase of 0.2 Nm is an important factor in order to obtain materials exhibiting good performance. Thus, it is advantageous that the abovementioned torque increase should be reached within a time longer than or equal to 4 minutes at the moulding temperature, and preferably between 4 and 6 minutes.

With regard to the so-called Vicat point, or softening point, it is known that this is a well known parameter for measuring the physical properties of a polymer. The Vicat point is the temperature at which a needle which has a circular cross-section of 1 $mm^2$ enters the sample to a depth of 1 mm when the temperature rises by 50° C. per hour according to ASTM Standard D1525. Thus, at this temperature, the polymer does not creep and is not in the molten state.

In general, the process consists in extruding or coextruding a tube of thermoplastic polymers which in all cases has an outer layer of thermoplastic elastomer containing polyamide blocks of at least 0.1 mm in thickness, an inner diameter of between 5 mm and 90 mm and a wall thickness of between 0.4 and 10 mm on an extrusion or coextrusion line equipped with a tube die, at speeds varying between 5 and 80 m/min.

When the tube of thermoplastic polymers contains an inner protective layer of polyamide with a melting point higher than 220° C., for example of polyamide 6 or of polyamide 66, the vulcanization of the sheath of elastomeric composition may be carried out continuously, for example in an UHF oven placed in line with the sheathing extruder. In this case the temperature of the oven (for example UHF) may rise to 180° C.

The elastomeric composition comprising the elastomer with its fillers, plasticizers and other adjuvants, but without the crosslinking system, is formulated in a suitable mixer and is then taken up optionally in another mixer at an appropriate temperature with the vulcanization system.

These formulation operations are carried out at temperatures which are lower than 120° so that the vulcanization system still remains inactive. The elastomer formulation is packaged in the form of strips such as are usually employed for feeding elastomer extruders.

Thus packaged, the elastomer formulation is extruded at a temperature which is sufficiently low for it not to crosslink, and the composite formed is then conveyed into a vulcanization autoclave where the outer layer is vulcanized at a temperature corresponding to the Vicat point of the thermoplastic elastomer containing polyamide blocks with a range from −5° C. to +30° C.

The thickness ratio of the outer elastomer layer to the layers of thermoplastic polymers is between 1 and 10.

When the vulcanization in autoclave is finished, at the end of a period of less than 15 minutes, advantageously between 5 and 10 minutes, determined beforehand using the $t_{90}$ of the oscillating rheometer, the tubular article is withdrawn from the autoclave.

When the wall thickness of the thermoplastic tube is changed, an empirical formula is applied which is well known in the technique of vulcanization of elastomers:

Vulcanization time (min)=$t_{90}$+(E/2−2) E being the thickness in mm.

The examples below illustrate the invention without, however, limiting it.

According to a general process of embodiment which is common to all the examples described, the elastomeric composition without the crosslinking system is formulated in a Repiquet R10 10-litre internal mixer whose rotors rotate at 60 rev/min. The operation takes place in a semiadiabatic regime, with reversion of mechanical energy into heat. An intimate mixture is obtained in less than 5 minutes and the temperature reaches 110° C.

Thus formulated, the elastomer is next taken onto a mill with rolls heated to 80° C. and the vulcanization system is added to it.

The tubes made of thermoplastic polymers are produced on a coextrusion plant equipped with a three-layer head and three extruders with a screw diameter of 45 mm, 30 mm and 45 mm, operating at a line speed of 20 m/min. The coextrusion head is equipped with a 5/8 mm die. The thermoplastic elastomer which is to function as a binder with the vulcanizable elastomer is always extruded as the outer layer. In a second stage, this tube is taken up on a plant for sheathing with elastomer which has a coating die calibrated to 8 mm and operating at a travelling speed of 15 m/min. The temperature of extrusion of the elastomer is 85°. The vulcanization is carried out discontinuously in a hot air oven by following the operating process already described.

The petrol permeability of these tubes is measured by a static method at 23° C. with C fuel oil containing 15% of methanol.

EXAMPLE 1, COMPARATIVE

A composition produced in an internal mixer, comprising, in parts by weight:

| | |
|---|---|
| a chemigum 775 69/24/7 butadiene/acrylonitrile/ acrylic acid elastomer | 70 |
| a PVC with K value 70 Lacovyl SK 70 | 30 |
| a PVC stabilising system dioctyl tin | 0.3 |
| zinc stearate | 0.3 |
| epoxidized soya oil | 1.5 |
| dioctyl phthalate | 25 |
| an antioxidant for the elastomer | 7 |
| FEF N 550 carbon black | 40 |
| ultrasil VN3 silica | 10 |
| PEG 4000 polyethylene glycol | 2 |
| polyvest C70 carboxylated polybutadiene | 4 |

This composition is mixed on a roll with a vulcanization system composed of:

| | |
|---|---|
| Sulphur | 1.6 |
| TMTD tetramethylthiuram disulphide | 1.5 |
| MBS mercaptobenzylsulphenamide | 1.5 |
| Zinc oxide | 5 |
| Stearic acid | 1 |

It is extruded on an extruder for elastomer as a 9/10 mm tube and then vulcanized at 160° for 10 minutes.

The petrol permeability of this tubular articles is 850 g/m² per 24 hours (per mm of thickness)

Absence of marking of the tubular article when it is bent and returned to its initial shape.

EXAMPLE 2, COMPARATIVE

A coextruded tube of Rilsan AESNTL PA12 and of thermoplastic elastomer containing PA12 blocks, marketed under the mark Pebax 5533, with a Vicat point of 145° is produced with a diameter of 5/8 mm, with an outer layer of Pebax 5533 of 0.2 mm. The petrol permeability of this tubular article is 80 g/m² per 24 hours for 1 mm of thickness. When this tubular article is bent below a certain radius of curvature, a cracking phenomenon is produced and the tubular article is marked.

EXAMPLE 3

The tube of Example 2 is taken up on an elastomer sheathing plant extruding the composition of Example 1 at 87° C. through a sheathing die.

The tubular article is then cut, mounted onto one of the 6-mm metal rods and placed in a hot air oven at 155° for 20 minutes. Its transverse dimensions are 9/10 mm after sheathing. The petrol permeability of this tube is 75 g/m² per 24 hours referred to 1 mm of thickness. This tubular article can be bent to a much smaller radius of curvature than the tube of Example 1 and does not retain any bending mark.

EXAMPLE 4, COMPARATIVE

An article of 5/8 mm size obtained on a three-layer coextrusion plant consists of:

an outer layer of thermoplastic elastomer containing PA12 (Pebax 6333) blocks with a Vicat point of 161°, 0.6 mm in thickness, a layer of 0.15 mm thickness of a mixture consisting of 65 parts by weight of polyurethane (Estane 58271), 35 parts by weight of an Orevac 9307 ethylene/ vinylacetate copolymer, a layer of polvinylidene fluoride (Foraflon 4000H) of 0.25 mm thickness.

This article is rigid and exhibits a poor bending strength.

EXAMPLE 5

The article of Example 4 is taken up on an elastomer sheathing plant extruding the composition of Example 1 at 87° through a sheathing die and is vulcanized according to the process described in Example 3 at 160° for 15 min.

Its dimensions are 9/10 mm after sheathing.

The petrol permeability of this tube is 10 g/mm² per 24 (referred to 1 mm thickness).

This article has the flexibility of a rubber article and can be bent without any mark being retained.

We claim:

1. A composite tubular article substantially resistant to separation comprising (a) at least an outer sheathing of a vulcanized elastomer containing carboxylic acid or dicarboxylic acid anhydride functional groups, used directly in combination with (b) a binder tube of thermoplastic elastomer containing polyamide blocks, and optionally (c) an inner sealing layer.

2. The composite tubular article of claim 1, wherein said (b) binder tube of thermoplastic elastomer comprises a polyetheresteramide containing polyamide blocks.

3. The composite tubular article of claim 1, wherein said outer sheathing is vulcanized by a system chosen from the group consisting of a sulphur system, a sulphur donating system, a phenolic resin system, and a peroxide system.

4. The composite tubular article of claim 1, wherein said (a) at least one outer sheathing of a vulcanized elastomer containing carboxylic acid or dicarboxylic acid anhydride functional groups comprises carboxylated nitrile elastomer, acrylic elastomer, carboxylated polybutadiene, grafted ethylene/propylene/diene terpolymer, polybutadiene, ethylene/propylene/diene terpolymer, hydrogenated nitrile rubber (HNBR), epichlorohydrin rubber

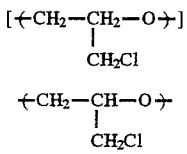

optionally containing at least one member of the group consisting of ethylene oxide units —($-CH_2-CH_2-O-$)— or vinyl acetate units, or mixtures of vulcanized elastomers.

5. The composite tubular article of claim 1, wherein said (c) inner sealing layer comprises a material selected from the group consisting of polyamide 6, polyamide 66, polyamide 11, polyamide 12, copolymers thereof, and blends of the polyamides with polyolefins, polyvinylidene fluoride or other thermoplastic polymers.

6. The composite tubular article of claim 1, further comprising one or more intermediate layers between said (c) inner sealing layer and said (b) binder tube of thermoplastic elastomer containing polyamide blocks.

7. The composite tubular article of claim 1, wherein said (a) at least one outer sheathing of a vulcanized elastomer containing carboxylic acid or dicarboxylic acid anhydride functional groups has a permanent compression set at 100° C. which is lower than 50%.

8. The composite tubular article of claim 1, wherein said (b) binder tube of thermoplastic elastomer containing polyamide blocks has a melting point of between 120° C. and 210° C.

9. The composite tubular article of claim 1, wherein said (a) at least one outer sheathing of a vulcanized elastomer containing carboxylic acid or dicarboxylic acid anhydride functional groups has a peel strength of at least 2 daN/cm.

10. The composite tubular article of claim 1, wherein said (a) at least one outer sheathing of a vulcanized elastomer containing carboxylic acid or dicarboxylic acid anhydride functional groups comprises carboxylic acid or dicarboxylic acid anhydride present at a concentration of between 0.3% and 10% relative to the weight of said outer sheathing.

11. The composite tubular article of claim 1, wherein said (a) at least one outer sheathing of a vulcanized elastomer containing carboxylic acid or dicarboxylic acid anhydride functional groups further comprises at least one filler present at a concentration of between 5 and 100 parts by weight per 100 parts of (a).

12. The composite tubular article of claim 1, wherein said (b) binder tube of thermoplastic elastomer containing polyamide blocks comprises a polyether containing polyamide blocks.

13. The composite tubular article of claim 1, wherein said (b) binder tube of thermoplastic elastomer containing polyamide blocks has a Vicat point between 100° C. and 200° C.

14. The composite tubular article of claim 1, wherein said (b) binder tube of thermoplastic elastomer containing polyamide blocks has a Vicat point between 130° C. and 175° C.

15. The composite tubular article of claim 1 wherein at least one outer sheathing of a vulcanized elastomer containing carboxylic acid or dicarboxylic acid anhydride functional groups comprises an acrylic elastomer and a diamine crosslinking system.

16. A process for the preparation of a composite tubular article, comprising (a) sheathing a binder tube of thermoplastic elastomer containing polyamide blocks by extrusion at an appropriate temperature with at least one outer sheath of a vulcanizable elastomer comprising carboxylic acid or dicarboxylic acid anhydride functional groups, a crosslinking system and, optionally, various adjuvants and fillers, and (b) vulcanizing said sheath.

17. The process for the preparation of the composite tubular article of claim 16, wherein said vulcanizing is completed at a temperature between −5° C. and +30° C. relative to a vicat point of said thermoplastic elastomer containing polyamide blocks.

18. The process for the preparation of the composite tubular article of claim 16, wherein said vulcanizing is completed in 15 minutes or less.

19. The process for the preparation of the composite tubular article of claim 16, wherein said vulcanizable elastomer is extruded at a temperature of between 50° C. and 120° C. into a sheathing die in which there is present a thermoplastic tube.

20. The process for the preparation of the composite tubular article of claim 16, wherein said vulcanizing is completed in a vulcanization autoclave for rubber that uses hot air and infrared radiation to achieve vulcanization.

21. The process for the preparation of the composite tubular article of claim 16, wherein the binder tube of thermoplastic elastomer containing polyamide blocks further comprises at least one filler present in an amount between 5 and 100 parts by weight per 100 parts of thermoplastic elastomer.

22. The process for the preparation of the composite tubular article of claim 17, wherein the vulcanization temperature is about at the Vicat point of the thermoplastic elastomer containing polyamide blocks.

23. The process for the preparation of the composite tubular article of claim 16, wherein said vulcanizing has a $t_{90}$ of 15 minutes or less.

24. The process for the preparation of the composite tubular article of claim 16, wherein said vulcanizing has a $t_{90}$ of between 5 minutes and 10 minutes.

25. The process for the preparation of the composite tubular article of claim 16, wherein said vulcanizing yields a torque increase of 0.3 Nm in between 4 minutes and 6 minutes.

26. The process for the preparation of the composite tubular article of claim 16, wherein said binder tube of thermoplastic elastomer containing polyamide blocks further comprises an inner protective layer wherein the inner protective layer comprises a polyamide with a melting point higher than 220° C.

27. The process for the preparation of the composite tubular article of claim 26, wherein said inner protective layer comprises polyamide 6 or polyamide 66.

28. The process for the preparation of the composite tubular article of claim 16, wherein said vulcanizing is carried out continuously by placing a UHF oven in line with a sheathing extruder.

* * * * *